(12) United States Patent
Fujino et al.

(10) Patent No.: US 7,235,610 B2
(45) Date of Patent: Jun. 26, 2007

(54) AQUEOUS DISPERSION, PROCESS FOR PRODUCING THE SAME, AND USE

(75) Inventors: Kenichi Fujino, Iwakuni (JP); Hidetoshi Yoshioka, Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 10/505,458

(22) PCT Filed: Feb. 28, 2003

(86) PCT No.: PCT/JP03/02308

§ 371 (c)(1),
(2), (4) Date: Apr. 5, 2005

(87) PCT Pub. No.: WO03/074606

PCT Pub. Date: Sep. 12, 2003

(65) Prior Publication Data

US 2005/0171271 A1    Aug. 4, 2005

(30) Foreign Application Priority Data

Mar. 5, 2002    (JP)    ............................. 2002-058419

(51) Int. Cl.
  *C08F 8/18*    (2006.01)
(52) U.S. Cl. ............... 525/334.1; 525/326.4; 525/355; 525/386; 525/285
(58) Field of Classification Search ................ 525/285, 525/326.4, 355, 334.1, 386
See application file for complete search history.

(56) References Cited

U.S. PATENT DOCUMENTS 5,539,043 A * 7/1996 Kimura et al. ............... 524/504
5,559,176 A   9/1996 Namba et al.
6,586,525 B1 * 7/2003 Urata et al. ................... 525/63

FOREIGN PATENT DOCUMENTS

| EP | 148346 | 7/1985 |
|---|---|---|
| EP | 1 065 245 A1 * | 1/2001 |
| JP | 5-209006 | 8/1993 |
| JP | 5-222320 | 8/1993 |
| JP | 6-80738 | 3/1994 |
| JP | 8-6009 | 1/1996 |
| JP | 2769958 | 4/1998 |
| JP | 11-302324 | 11/1999 |
| JP | 11-315185 | 11/1999 |
| JP | 3045498 | 3/2000 |
| JP | 2001-114961 | 4/2001 |
| JP | 2001-206914 | 7/2001 |
| WO | WO 90/12656 | 11/1990 |
| WO | WO 03/002659 A1 | 1/2003 |

* cited by examiner

Primary Examiner—Ling-Sui Choi
(74) Attorney, Agent, or Firm—Oblon, Spivak, McClelland, Maier & Neustadt, P.C.

(57) ABSTRACT

The purpose of the invention is to provide a novel aqueous dispersion that allows high solidification and that has good adherence and gasohol resistance to polyolefin substrates even on low-temperature baking.

An aqueous dispersion characterized by dispersedly containing carboxyl group-containing chlorinated propylenic random copolymer with chlorine content of 5 to 40% by weight, grafting level of $\alpha,\beta$-unsaturated carboxylic acid or its anhydride of 0.1 to 20% by weight and weight average molecular weight of 10,000 to 300,000, and stabilizer, a method for the production and the uses thereof.

10 Claims, No Drawings

AQUEOUS DISPERSION, PROCESS FOR PRODUCING THE SAME, AND USE

TECHNICAL FIELD

The present invention relates to an aqueous dispersion to be used on painting polypropylene and various hard-adherent resin moldings. In more detail, it relates to an aqueous dispersion suitable for primer, paint, ink and the adhesive uses on adhering said moldings to other substrates.

BACKGROUND TECHNOLOGIES

From the reasons of high chemical stability, low price, excellent balance of physical properties, possible recycling, etc., the amount of using polyolefinic resins such as polypropylene is increasing centering around automotive parts, household electrical appliances and moldings for general goods.

However, polyolefinic resin is nonpolar and has a drawback of difficult painting and adhesion. Hence, it is a general trend to use chlorinated polypropylene or acid-modified chlorinated polypropylene as a constituting element of primer, paint, ink and adhesive.

Traditionally, these chlorinated resins were used after dissolving into aromatic organic solvent such as toluene or xylene, but, from the viewpoints of environmental problems and safety and hygiene, attempts on aqueous conversion are being made widely (Japanese Patent Publication No. Hei 8-6009, Japanese Unexamined Patent Publication Nos. Hei 5-209006 and Hei 6-80738, Japanese Patent No. 2769958, WO90/12656, etc.).

However, these aqueous converted resins have such a problem that they require a great deal of energy and time in the processes of drying and baking after coated onto substrate over the solvent-based resins.

For solving this problem, correspondences to high solidification and low-temperature baking of aqueous dispersion of chlorinated resins have become to be sought. On the other hand, high modularization of polyolefin substrates is advancing and, in particular, under the low-temperature baking condition sat around 80 to 90° C., sufficient adherent strength cannot be achieved with the aqueous dispersions that originate from conventional chlorinated resins, resulting in difficult correspondence. Furthermore, in the uses for automotive parts, it has become to be sought to combine also with gasohol resistance etc., creating a situation of more difficult correspondence.

One of the means for corresponding to the low-temperature baking, a method of lowering the softening temperature of raw material polypropylene is effective, but, in order to lower the softening temperature in the polymerization process that uses conventional Ziegler·Natta catalyst, it is required to increase the composition ratio of ethylene or other α-olefin, resulting in decreased physical properties such as adherence and gasohol resistance. If increasing the molecular weight of chlorinated resin to suppress the decreased physical properties, then poor dispersion results due to increased melt viscosity in the aqueous converting process, or the viscosity of final product obtained increases, thus becoming unsuitable for the high solidification.

Moreover, conventional polypropylene and copolymer of propylene with ethylene or other α-olefin have a wide molecular weight distribution, hence the molecular weight distribution after acid modification or chlorination also becomes wide, and the adherence and solvent resistance decrease due to the existence of relatively low-molecular components. In particular, decrease in the gasohol resistance is remarkable, and, in order to improve this, a process for removing the low-molecular components is required by performing extraction with solvent, etc., which is uneconomical.

Whereas, syndiotactic polypropylene (hereinafter SPP), produced by using metallocene catalyst has features of low softening temperature and also narrow molecular weight distribution, and technologies of primer comprising chlorinated resin that utilizes this SPP are disclosed (Japanese Patent No. 3045498 etc.). However, since most of the substrates have isotactic polypropylene (IPP) produced by using Ziegler·Natta catalyst as a major component, sufficient adherent strength cannot be achieved.

As described above, with the aqueous dispersions that use conventional chlorinated resins, it was impossible to achieve good adherent strength and gasohol resistance, while corresponding to the high solidification and low-temperature baking.

The purpose of the invention is to provide a novel aqueous dispersion that allows the high solidification and that has good adherence and gasohol resistance to polypropylene and various hard-adherent resin substrates even on low-temperature baking.

As a result of diligent investigations to solve the subjects, the inventors have found that an aqueous dispersion of carboxyl group-containing chlorinated propylenic random copolymer originating from propylenic random copolymer polymerized in the presence of metallocene catalyst solves the subjects. In addition, it has been found that the aqueous dispersion of the invention not only exhibits good adherence on to polypropylene substrates, but also exhibits good adherence similarly onto PET and other hard-adherent substrates.

DISCLOSURE OF THE INVENTION

According to the invention, following (1) through (8) are provided.

(1) An aqueous dispersion characterized by dispersedly containing carboxyl group-containing chlorinated propylenic random copolymer with chlorine content of 5 to 40% by weight, grafting level of α,β-unsaturated carboxylic acid or its anhydride of 0.1 to 20% by weight and weight average molecular weight of 10,000 to 300,000, and stabilizer.

(2) The aqueous dispersion of (1), wherein surfactant and basic substance are contained additionally.

(3) A method of producing aqueous dispersion characterized by dispersing carboxyl group-containing chlorinated propylenic random copolymer with weight average molecular weight of 10,000 to 300,000, chlorinated up to chlorine content of 5 to 40% by weight, after or before graft copolymerizing α,β-unsaturated carboxylic acid or its anhydride onto propylenic random copolymer produced by using metallocene compound as a polymerization catalyst in amounts of 0.1 to 20% by weight, into water.

(4) The method of producing aqueous dispersion of (3), wherein, after surfactant and basic substance were added additionally to said carboxyl group-containing chlorinated propylenic random copolymer, the mixture is dispersed into water.

(5) A primer using the aqueous dispersion of (1) or (2).
(6) A paint using the aqueous dispersion of (1) or (2).
(7) An ink using the aqueous dispersion of (1) or (2).
(8) An adhesive using the aqueous dispersion of (1) or (2).

The propylenic random copolymer being raw material of the invention is a propylenic random copolymer obtained by copolymerizing propylene being major component with other α-olefin as a comonomer, using metallocene catalyst as a polymerization catalyst. Commercial products such as Novatech (from Nippon Polychem Co., Ltd.) can also be used.

For the other α-olefin being comonomer, at least one kind can be selected from ethylene or a group consisting of olefins with number of carbon atoms of 4 or more. As the olefins with number of carbon atoms of 4 or more, 1-butene, 1-hexene, 4-methyl-1-pentene, 1-octene, etc. can be mentioned. By using metallocene catalyst, the range of copolymerizable comonomers can be widened over Ziegler·Natta catalyst.

For the metallocene catalyst to be used here, publicly known one can be used. Concretely, such catalyst obtainable by combining components (A) and (B), and, if need be, additionally (C) described below is desirable.

Component (A); Metallocene complex being a compound of transition metal that belongs to groups 4 to 6 in the periodic table having at least one of conjugate 5-membered ring ligand.

Component (B); Cocatalyst capable of activating said metallocene complex (A) by reacting compound (B) with metallocene complex (A) (ion-exchangeable stratified silicate). Component (C); Organic aluminum compound.

The propylenic random copolymer of the invention can be produced by publicly known methods (Japanese Unexamined Patent Publication No. 2001-206914 etc.). For example, while supplying propylene, ethylene and hydrogen into the reactor and while continuously adding alkyl aluminum and metallocene catalyst, the production is performed.

The propylenic random copolymer of the invention is preferable to have melting point (hereinafter Tm) measured by differential scanning calorimeter (hereinafter DSC) of 115 to 165° C., and the composition of olefins and the polymerization conditions can be selected appropriately. If higher than 165° C., then the solvent solubility decreases. If lower than 115° C., the adherence onto prime materials decreases. More preferable is low-melting point propylenic random copolymer with 115 to 135° C.

In the measurement of Tm by DSC in the invention, the evaluation was made with both peak temperature of melting and end temperature of melting at the time when about 5 mg of sample were molten for 5 minutes at 200° C., and, after lowered the temperature to 40° C. at a rate of 10° C./min to crystallize, the temperature was raised further to 200° C. at a rate of 10° C./min to melt, using DSC measurement apparatus from Seiko Denshi Kogyo Co.

For the propylenic random copolymer of the invention, it doesn't matter whether one thermally degraded by publicly known method at a temperature above melting point and below 350° C. in the presence of radical generator or one without thermal degradation is used solely or by mixing, employing Banbury mixer, kneader, extruder or the like. The radical generator to be used for the reaction can be selected appropriately from publicly known ones, but, in particular, organic peroxide type compound is desirable.

As said organic peroxide type compounds, for example, di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)cyclohexane, cyclohexanone peroxide, t-butylperoxy benzoate, t-butylperoxy isobutyrate, t-butylperoxy-3,5,5-trimethyl hexanoate, t-butylperoxy-2-ethyl hexanoate, t-butylperoxyisopropyl carbonate, cumylperoxy octoate, etc. are mentioned.

Moreover, in the invention, the propylenic random copolymer obtained as described above can be used solely or in combination of a plurality of kinds. In particular, it is preferable to use one with Tm within a range of 115 to 165° C. In addition, ones mixed with other polyolefins such as IPP and SPP can also be used. Although dependent on the uses, IPP or SPP can be mixed up to 50% by weight in overall resin.

The carboxyl group-containing chlorinated propylenic random copolymer of the invention can be obtained by introducing α,β-unsaturated carboxylic acid and chlorine to said propylenic random copolymer and the production thereof is possible by two methods mentioned below. Namely, a method (first method) wherein, after graft polymerized α,β-unsaturated carboxylic acid or its anhydride onto propylenic random copolymer beforehand, the chlorination reaction is conducted, and a method (second method) wherein, after the chlorination reaction, α,β-unsaturated carboxylic acid or its anhydride is graft polymerized. The first method is more excellent in the various physical properties of final aqueous dispersion.

In following, concrete productive methods thereof will be exemplified. In the first method, that is, in the method of first graft copolymerizating α,β-unsaturated carboxylic acid or its anhydride onto propylenic random copolymer, the graft polymerization can be performed regardless of the presence of radical initiator, but the use of radical initiator is more preferable, and it is preferable to use organic peroxides, for example, benzoyl peroxide, dicumyl peroxide, lauroyl peroxide, di-t-butyl peroxide, cumene hydroperoxide, etc. The kind and the use level of radical initiator can be selected appropriately depending on the reaction conditions, but it is desirable to use around 0.1 to 5% by weight based on propylenic random copolymer (solids). If lower than this range, then the rate of graft reaction decreases and, even if higher, decrease in the rate of graft reaction and side reactions such as internal crosslinking and shift to lower molecular weight are caused. The reaction can be conducted by publicly known methods of a method (melt method) wherein said rein is molten by heating above melting point in the presence of radical generator to react, a method (solution method) wherein said rein is dissolved into organic solvent and then the solution is stirred under heating in the presence of radical generator to react, and the like.

In the case of the melt method, the reaction is conducted for a short time at a temperature above melting point and below 300° C. employing Banbury mixer, kneader, extruder or the like, hence it has an advantage of simple manipulation.

On the other hand, in the solution method, it is desirable to use aromatic solvent such as toluene or xylene as an organic solvent, but, besides, it may also be safe to use ester solvent, ketonic solvent or the like by mixing partially. The radical generator to be used for the reaction can be selected appropriately from publicly known ones, but, in particular, organic peroxide type compound is desirable and, as the organic peroxide type compounds, those listed above can be used.

In the case of the solution method, when conducting the chlorination reaction after α,β-unsaturated carboxylic acid or its anhydride was graft copolymerized, it is required to evaporate said solvent and replace with chlorinating solvent such as chloroform, hence, in the first method, melt method is more preferable.

The chlorination reaction to be conducted successively can be carried out easily by the publicly known method. For example, the reaction is conducted by dispersing or dissolving the propylenic random copolymer graft copolymerized with α,β-unsaturated carboxylic acid or its anhydride into a medium such as water or chloroform and by blowing-in chlorine gas whithin a temperature range from 50 to 130° C. under pressure or ambient pressure in the presence of catalyst or under irradiation of ultraviolet rays. If under 50° C., then the chlorination reaction becomes inhomogeneous, resulting in aggravated solvent solubility and, if higher than 130° C., then shift to lower molecular weight takes place during the chlorination reaction, resulting in decreased adhesiveness and printability.

In the method wherein, after the chlorination reaction, α,β-unsaturated carboxylic acid or its anhydride is graft polymerized being the second method, first, propylenic random copolymer is dissolved into chlorine-based solvent such as chloroform and the chlorination reaction is conducted similarly to the first method to produce chlorinated propylenic random copolymer, then solvent is changed to a solvent such as toluene or xylene, and α,β-unsaturated carboxylic acid or its anhydride is graft copolymerized in the presence of said organic peroxide. The reaction can be carried out at a temperature above 50° C. and below the boiling point of solvent. In the first method and the second method, the order of addition, method, etc. of α,β-unsaturated carboxylic acid or its anhydride and initiator can be selected appropriately. Moreover, it is also possible to remove the remaining monomers by installing a vacuum process at the time of the completion of reaction.

The feature of the invention lies in that, even without installing the removing process of low molecular weight components such as solvent extraction, various physical properties are excellent, but it may be safe, of course, to remove the low molecular weight components. In the case of removing the low molecular weight components, it is preferable to perform after graft polymerized α,β-unsaturated carboxylic acid or its anhydride.

In the invention, the purpose of graft copolymerizing α,β-unsaturated carboxylic acid or its anhydride onto propylenic random copolymer is to provide the adherence onto upper coating paint when using the aqueous dispersion of the invention as a primer and further to enhance the dispersibility into water. The chlorinated polyolefin has originally low polarity, hence, when using as a primer (undercoating agent) as it is, the adherence onto PP prime material is good, but ittle adherence is seen onto high-polar upper coating paints (e.g. polyurethane paint and melamine paint). Hence it be comes important to enhance the polarity of chlorinated polyolefin by graft copolymerizing α,β-unsaturated carboxylic acid or its anhydride. Moreover, by enhancing the polarity of chlorinated polyolefin, the adherent strength to PET and other various hard-adherent substrates is also provided.

As usable α,β-unsaturated carboxylic acids or their anhydrides, for example, maleic acid, citraconic acid, itaconic acid, aconitic acid and their anhydrides, acrylic acid, methacrylic acid, fumaric acid, mesaconic acid, etc. are exemplified. These unsaturated carboxylic acids or their anhydrides can be used solely or in combination, but, when considering the grafting ability onto polyolefin resin, maleic anhydride is most suitable.

In the invention, the amount to be introduced by graft copolymerizing α,β-unsaturated carboxylic acid or its anhydride is optimum to be 0.1 to 20% by weight based on raw material propylenic random copolymer. If the content is lower than this range, then good aqueous dispersion cannot be obtained and the adherence etc. decrease as well, and conversely, if too high, then unreacted unsaturated carboxylic acid or its anhydride generate in large quantities or the water resistance etc. decrease, which is unpreferable. More preferable is 1.0 to 10% by weight. Besides, the grafting weight % of α,β-unsaturated carboxylic acid or its anhydride can be determined by alkali titration method or FT-IR method.

The lower the chlorine content of carboxyl group-containing chlorinated propylenic random copolymer, the better the adherence onto polypropylenic resin, but, if too low, the softening point and the melting point of resin increase, resulting in decreased adherence on baking at low temperature.

Moreover, if the chlorine content increases, then the adherence onto polypropylenic resin decreases, hence the chlorine content is optimum to be 5 to 40% by weight, preferably 15 to 30% by weight. Besides, the degree of chlorination of carboxyl group-containing chlorinated propylenic random copolymer can be determined by titration according to JIS K 7210.

The weight average molecular weight (hereinafter Mw) of carboxyl group-containing chlorinated propylenic random copolymer to be used in the invention is 10,000 to 300,000. If under 10,000, then the cohesion of resin is insufficient, and, if over 300,000, then the handling behaviors of ink and adhesive decrease, which is unpreferable. Besides, the Mw in the invention is a value measured by means of gel permeation chromatography (hereinafter GPC, standard substance:polystyrene resin).

The chlorinated polyolefin accompanies the de-hydrochloric acid to degrade when exposing to ultraviolet rays or high temperature. In particular, if heated or undergone mechanical shearing force in the emulsification process, it tends to cause the de-hydrochloric acid. If the carboxyl group-containing chlorinated propylenic random copolymer causes the degradation due to de-hydrochloric acid, then decreased physical properties such as decreased adherence onto PP substrates as well as coloring of resin, and decreased stability of aqueous dispersion and aggravated working environment are caused due to freed hydrochloric acid, hence the addition of stabilizer is essential. Particularly preferable material as a stabilizer is epoxy compound. The epoxy compound is not particularly restricted, but one compatible with chlorinated resin is preferable and such epoxy compound with epoxy equivalent of around 100 to 500 and with one or more epoxy groups in a molecule can be exemplified. For example, epoxidated soybean oil and epoxidated linseed oil epoxidated natural vegetable oils with unsaturated group with peracid such as peracetic acid, epoxidated fatty acid esters epoxidated unsaturated fatty acids such as oleic acid, tall oil fatty acid and soybean oil fattyacid, alicyclic epoxy compounds such as cyclohexene oxide, α-pinene oxide and 3,4-epoxycyclohexylmethyl-3', 4'-epoxycyclohexane carboxylate, condensation products of bisphenol A and polyhydric alcohols with epichlorohydrin, for example, bisphenol A glycidyl ether, ethylene glycol glycidyl ether, propylene glycol glycidyl ether, glycerol polyglycidyl ether, sorbitol polyglycidyl ether, etc. are exemplified.

Besides, monoepoxy compounds represented by butyl glycidyl ether, 2-ethylhexyl glycidyl ether, decyl glycidyl ether, stearyl glycidyl ether, allyl glycidyl ether, phenyl glycidyl ether, s-butylphenyl glycidyl ether, t-butylphenyl glycidyl ether, phenol polyethylene oxide glycidyl ether, etc. are exemplified. Moreover, metallic soaps such as calcium stearate and lead stearate used as stabilizers for poly(vinyl chloride) resin, organometallic compounds such as dibutyl tin dilaurate and dibutyl maleate and hydrotalcite compounds can also be used, and it may be safe to use these in combination.

The use level of epoxy compound can be selected appropriately depending on the epoxy equivalent and use conditions, but it is preferable to be 0.1 to 10% by weight based on the weight of carboxyl group-containing chlorinated propylenic random copolymer. If lower than 0.1% by weight, then there is no effect as a stabilizer and, If higher than 10% by weight, then not only the excessive use is uneconomical, but also the physical properies sometimes decrease. The epoxy compound can seize the free hydrochloric acid that generates due to heat and mechanical shearing force by adding before emulsification process, or it allows also to adjust so as the pH value not to fluctuate on storage or use due to free hydrochloric acid, by adding an epoxy compound aqueous converted separately after emulsification.

In the invention, the aqueous dispersion dispersedly containing carboxyl group-containing chlorinated propylenic random copolymer indicates one in the state of emulsion and can be obtained by publicly known method. For example, a method, wherein the carboxyl group-containing chlorinated propylenic random copolymer is molten at about 100° C. and, after the stabilizer, small quantity of organic solvent and, if need be, surfactant and basic substance were added, molten and kneaded, water of 80 to 98° C. is added to form W/O type emulsion, and, while adding water successively, this is subjected to phase inversion to O/W type emulsion, can be used.

For the emulsifying devices, for example, cylindrical reactor equipped with anchor type stirring blades or max-blend type stirring blades, or further equipped with high-speed stirrer such as Homogenizer or Disper, for example, Harmotech (from M. Technic), Highvis Dispermix (from Tokushu Kika Kogyo), Combimix (from Tokushu Kika Kogyo), etc., and further twin screw extruder etc. can be used. Moreover, it is also possible to emulsify at a temperature of above 100° C. under pressure using a device such as autoclave equipped with stirrer.

In the invention, if using surfactant on emulsification, there is an effect that allows to give more stable aqueous dispersion and, in particular, it may be used when obtaining an aqueous dispersion with high concentration. As the surfactants, nonionic surfactants such as polyoxyalkylene alkyl ester, polyoxyalkylene alkyl ether, polyoxyalkylene alkylphenyl ether, sucrose ester, sorbitan alkyl ester, sorbitan fatty acid ester, propylene glycol ester, polyglycerine ester, fatty acid alkanol amide, fatty acid monoglyceride and polyoxyalkylene alkylamine are mentioned. It is possible to achieve improved dispersibility of aqueous dispersion, etc. by using anionic surfactant, canionic surfactant or ampholytic surfactant with said nonionic surfactant in combination, but they remarkably decrease the water resistance of coated film, hence the use is limited to an extremely small quantity. The kind and the use level of surfactant can be selected appropriately, but it is preferable to be 5 to 30% by weight (based on solids) based on carboxyl group-containing chlorinated propylenic random copolymer. If lower than this range, then the stability of aqueous dispersion is aggravated and, if higher, then the water resistance decreases remarkably, which is unpreferable.

Furthermore, if the carboxyl group-containing chlorinated propylenic random copolymer is emulsified by using said surfactant and basic substance, it is possible to neutralize the carboxyl group with basic substance, resulting in improved dispersibility. As the basic substances, sodium hydroxide, potassium hydroxide, sodium carbonate, ammonium carbonate, potassium carbonate, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, morpholine, etc. can be exemplified. The kind and the amount of basic substance to be used can be selected appropriately, but the pH value of aqueous dispersion is designed so as to become 6 to 9.5, preferably 7 to 8.5. If pH value is lower than 6, then the dispersibility decreases and, if higher than 9.5, then the elimination of hydrochloric acid is remarkable, which is unpreferable.

The concentration of the inventive aqueous dispersion may be selected appropriately depending on the uses. Since the coating workability is injured at either too high or too low concentration of dispersion, the solids concentration of carboxyl group-containing chlorinated propylenic random copolymer is preferable to be 5 to 60% by weight.

The aqueous dispersion in the invention can be used as a primer, paint, ink and adhesive applicable to films, sheets and moldings comprising polypropylene, PET and various hard-adherent resins. It may be used by coating as it is, but solvent for increasing drying rate, pigment and other additives such as viscosity modifier, primary antirust, defoamer, wetting agent, fluidity aid and antimold may be added in necessary amount for use, within a range not injuring the effect of the invention. Moreover, although the coated film obtainable from said aqueous dispersion exhibits balanced physical properties by itself, it may be safe to further add other aqueous resins, for example, aqueous polyurethane resin, aqueous blocked isocyanate, aqueous epoxy resin, aqueous acrylic resin, aqueous phenol resin, aqueous amino resin, aqueous alkyd resin, aqueous chlorinated rubber, aqueous silicone resin, etc. for use.

EMBODIMENT TO PUT THE INVENTION INTO PRACTICE

In following, the invention will be illustrated in more detail by showing examples, but the invention is not confined to these examples at any rate.

[Measuring Method of Physical Properties]

MFR (Melt flow rate)

Measurement was made according to Melt Flow Rate in JIS-K-6758 Testing Method of Polypropylene (conditions: 230° C., load 2.16 kgf).

Tm

Sample (ca. 5 mg) was taken and molten for 5 minutes at 200° C., using DSC measurement apparatus from Seiko Co. Thereafter, the evaluation was made with both peak temperature of melting and end temperature of melting at the time when, after lowered the temperature to 40° C. at a rate of 10° C./min to crystallize, the temperature was raised further to 200° C. at a rate of 10° C./min to melt, Chlorine content Measurement was made according to JIS-K-7229.

Mw

Measurement was made by means of GPC (standard substance: polystyrene resin).

Grafting amount of unsaturated carboxylic acid or its anhydride

Determination was made by alkali titration method.

Viscosity

Measurement was made using Brookfield viscometer. The number of revolutions were 60 rpm and #2 rotor was used.

Average particle diameter

Measurement was made using Zeta Sizer 3000HS (from Sysmex Co. Ltd.).

TRIAL EXAMPLE 1

A hundred parts by weight of propylenic random copolymer (Novatech, from Nippon Polychem Co., Ltd., MFR=7.0 g/10 min, Tm=125° C.) produced by using metallocene catalyst, 4 parts by weight of powdery maleic anhydride (from Nippon Oil and Fats Co.) and 2 parts by weight of di-t-butyl peroxide were kneaded.

Thereafter, the mixture was fed into a twin screw extruder (L/D=60, φ 15 mm, first barrel through eighth barrel) and the reaction was conducted under the conditions of retention time of 5 minutes, number of revolutions of 300 rpm and barrel temperatures of 120° C. (first and second barrels), 180° C. (third and fourth barrels), 100° C. (fifth barrel) and 130° C. (sixth through eighth barrels). Vacuum treatments were performed at sixth, seventh and eighth barrels to obtain maleic anhydride-modified propylenic random copolymer. In a 50 L volume glass-lined reactor were put 2 kg of this resin, and 20 L of chloroform were added. Gaseous chlorine was blown-in from the bottom of reactor under a pressure of 2 kg/cm$^2$, while irradiating ultraviolet rays to chlorinate. On the way, sampling was made and chloroform being solvent was distilled off by evaporator, respectively, to adjust the solids to 30% by weight. After 1.5% by weight, based on resin, of stabilizer (t-butylphenyl glycidyl ether) were added to each of these chloroform solutions, each solution was fed into a twin screw extruder (L/D=34, φ 40 nm, first barrel through seventh barrel) to solidify under the conditions of retention time of 10 minutes, number of revolutions of 50 rpm and barrel temperatures of 90° C. (first through sixth barrels) and 70° C. (seventh barrel). Vacuum treatments were performed at first, fourth, fifth and sixth barrels to obtain maleic anhydride-modified chlorinated propylenic random copolymers.

The Mw of the maleic anhydride-modified chlorinated propylenic random copolymer thus obtained became 77,000 and the grafted weight of maleic anhydride became 2.4% by weight. As for the chlorine content, two kinds of 20.5% by weight and 15.6% by weight were obtained.

TRIAL EXAMPLE 2

A hundred parts by weight of propylenic random copolymer (Novatech, from Nippon Polychem Co., Ltd., MFR=7.0 g/10 min, Tm=125° C.) produced by using metallocene catalyst, 3 parts by weight of powdery maleic anhydride (from Nippon Oil and Fats Co.) and 2 parts by weight of 2,5-dimethyl-2,5-di(t-butylperoxy)hexane were kneaded. Thereafter, the mixture was fed into a twin screw extruder (L/D=60, φ 15 mm, first barrel through eighth barrel) and the reaction was conducted under the conditions of retention time of 5 minutes, number of revolutions of 300 rpm and barrel temperatures of 120° C. (first and second barrels), 170° C. (third and fourth barrels), 120° C. (fifth barrel) and 130° C. (sixth through eighth barrels). Vacuum treatments were performed at sixth, seventh and eighth barrels to obtain maleic anhydride-modified propylenic random copolymer. In a 50 L volume glass-lined reactor were put 2 kg of this resin, and 20 L of chloroform were added. Gaseous chlorine was blown-in from the bottom of reactor under a pressure of 2 kg/cm$^2$, while irradiating ultraviolet rays to chlorinate.

On the way, sampling was made and chloroform being solvent was distilled off by evaporator, respectively, to adjust the solids to 30% by weight. After 1.5% by weight, based on resin, of stabilizer (t-butylphenyl glycidyl ether) were added to each of these chloroform solutions, each solution was fed into a twin screw extruder (L/D=34, φ 40 mm, first barrel through seventh barrel) to solidify under the conditions of retention time of 10 minutes, number of revolutions of 50 rpm and barrel temperatures of 90° C. (first through sixth barrels) and 70° C. (seventh barrel).

Vacuum treatments were performed at first, fourth, fifth and sixth barrels to obtain maleic anhydride-modified chlorinated propylenic random copolymers.

The Mw of the maleic anhydride-modified chlorinated propylenic random copolymer thus obtained became 120,000 and the grafted weight of maleic anhydride became 2.0% by weight.

As for the chlorine content, two kinds of 20.7% by weight and 15.5% by weight were obtained.

TRIAL EXAMPLE 3

SPP (MFR=3.7 g/10 min, Tm=130° C.) was fed into a twin screw extruder (L/D=34, φ 40 mm, first barrel through seventh barrel) and the thermal degradation was conducted under the conditions of retention time of 10 minutes and barrel temperature of 350° C. (first barrel through seventh barrel) to obtain a resin with melt viscosity at 190° C. of about 2000 mPa·s.

Substituting the resin obtained for the propylenic random copolymer produced by using metallocene catalyst in Trial example 1, maleic anhydride-modified chlorinated SPPs were obtained by the similar manipulation to Trial example 1. The weight average molecular weight of the maleic anhydride-modified chlorinated SPP thus obtained became 58,000 and the grafted weight of maleic anhydride became 2.8% by weight. As for the chlorine content, two kinds of 20.4% by weight and 15.5% by weight were obtained.

TRIAL EXAMPLE 4

Substituting a propylene-ethylene copolymer (ethylene content 5%, melt viscosity 830 mPa·s/180° C., Tm=126° C.) obtained by using Ziegler·Natta catalyst for the propylenic random copolymer produced by using metallocene catalyst in Trial example 1, maleic anhydride-modified chlorinated propylene-ethylene copolymers were obtained by the similar manipulation to Trial example 1. The weight average molecular weight of the maleic anhydride-modified chlorinated propylene-ethylene copolymer thus obtained became 66,000 and the grafted weight of maleic anhydride became 2.5% by weight.

As for the chlorine content, two kinds of 20.5% by weight and 15.8% by weight were obtained.

EXAMPLE 1

Into a 2 L volume four-neck flask attached with stirrer, condenser, thermometer and dropping funnel were added 200 g of the resin with chlorine content of 20.5% by weight between the maleic anhydride-modified chlorinated propylenic random copolymers obtained in Trial example 1, 33 g of surfactant (Ethomine T/25, from Lion Corp.), 8 g of stabilizer (stearyl glycidyl ether) and 36 g of xylene, and the mixture was kneaded for 30 minutes at 120° C. Next, 8 g of 2-amino-2-methyl-1-propanol were added over 5 minutes and, after kept for 5 minutes, 970 g of hot water of 90° C. were added over 40 minutes. After xylene was removed by vacuum treatment, the mixture was cooled to room temperature while stirring to obtain an aqueous dispersion. The solids of the aqueous dispersion were 30% by weight, pH=7.0, the viscosity was 97 mPa·s/25° C., and the average particle diameter was 220 nm.

EXAMPLE 2

Changing the maleic anhydride-modified chlorinated propylenic random copolymer in Example 1 into the resin with chlorine content of 15.6% by weight obtained in Trial example 1 and further changing the surfactant into Eleminol NA-120 (from Sanyo Chemical Industries, Ltd.), an aqueous dispersion was obtained by the similar manipulation to Example 1. The solids of the aqueous dispersion were 30% by weight, pH=7.3, the viscosity was 148 mPa·s/25° C., and the average particle diameter was 254 nm.

EXAMPLE 3

Changing the maleic anhydride-modified chlorinated propylenic random copolymer in Example 1 into the resin with chlorine content of 20.7% by weight obtained in Trial example 2, an aqueous dispersion was obtained by the similar manipulation to Example 1. The solids of the aqueous dispersion were 30% by weight, pH=7.7, the viscosity was 102 mPa·s/25° C., and the average particle diameter was 243 nm.

EXAMPLE 4

Changing the maleic anhydride-modified chlorinated propylenic random copolymer in Example 1 into the resin with chlorine content of 15.5% by weight obtained in Trial example 2, and further changing the surfactant into Eleminol NA-120 (from Sanyo Chemical Industries, Ltd.), an aqueous dispersion was obtained by the similar manipulation to Example 1. The solids of the aqueous dispersion were 30% by weight, pH=7.1, the viscosity was 205 mPa·s/25° C., and the average particle diameter was 354 nm.

COMPARATIVE EXAMPLE 1

Using the maleic anhydride-modified chlorinated syndiotactic polypropylene with chlorine content of 20.4% by weight obtained in Trial example 3, an aqueous dispersion was prepared similarly to Example 1. As for the physical properties of the aqueous dispersion thus obtained, the solids were 30% by weight, pH=6.9, the viscosity was 94 mPa·s/25° C., and the average particle diameter was 194 nm.

COMPARATIVE EXAMPLE 2

Using the maleic anhydride-modified chlorinated syndiotactic polypropylene with chlorine content of 15.5% by weight obtained in Trial example 3, an aqueous dispersion was prepared similarly to Example 2. As for the physical properties of the aqueous dispersion thus obtained, the solids were 30% by weight, pH=7.5, the viscosity was 237 mPa·s/25° C., and the average particle diameter was 241 nm.

COMPARATIVE EXAMPLE 3

Using the maleic anhydride-modified chlorinated propylene-ethylene copolymer with chlorine content of 20.5% by weight obtained in Trial example 4, an aqueous dispersion was prepared similarly to Example 1. As for the physical properties of the aqueous dispersion thus obtained, the solids were 30% by weight, pH=7.2, the viscosity was 67 mPa·s/25° C., and the average particle diameter was 83 nm.

COMPARATIVE EXAMPLE 4

Using the maleic anhydride-modified chlorinated propylene-ethylene copolymer with chlorine content of 15.8% by weight obtained in Trial example 4, an aqueous dispersion was prepared similarly to Example 2. As for the physical properties of the aqueous dispersion thus obtained, the solids were 30% by weight, pH=7.5, the viscosity was 205 mPa·s/25° C., and the average particle diameter was 262 nm.

[Performance Test]

To the aqueous dispersions obtained in Examples 1 through 4 and Comparative examples 1 through 4, 1.5% by weight (based on aqueous dispersion) of 1% aqueous solution of Surfron S-141 from Seimi Chemical Co.) were added, respectively, as a wetting agent, and then following heat seal strength test, primer test and adherence test onto various substrates were performed. The results are shown in Table 1 and Table 2.

Heat Seal Strength Test

Each sample was coated onto an oriented polypropylene film after corona surface treatment using #8 Meyer bar, which was dried for 15 hours at room temperature. The coated surfaces were superposed between themselves and heat sealed under the conditions of 1.5 kg/cm$^2$, 90° C. and 10 sec employing No. 276 Heat Seal Tester (from Yasuda Seiki Seisakusho). Each specimen was cut so as the width to become 1 cm and peeled off under the conditions of 5 kg weight and 100 mm/min employing tensile tester to measure the peeling strength thereof. Tests were carried out thrice and the average value was shown as a result.

Primer Test

Each sample was spray coated onto an ultrahigh modulus polypropylene plate with the surface wiped with isopropanol so as the dried film thickness to become over 10 and under 15 μm, which was dried for 30 minutes at 90° C. Next, two-component type white upper paint was spray coated so as the dried film thickness to become over 45 and under 50 μm, and, after allowed to stand statically for 15 minutes at room temperature, baking was performed for 30 minutes at 90° C. After the specimen was allowed to stand statically for 3 days at room temperature, following tests were carried out.

Adherence

On the coated surface, 100 cross-cuts that reach the base were made at intervals of 2 mm, and cellophane adhesive tape was adhered closely thereon. Then, it was peeled off in the direction of 180° to judge with the extent of remaining coated film.

Gasohol resistance

The specimen was soaked into regular gasoline/ethanol=9/1 (v/v) for 120 minutes to observe the state of coated film.

Warm Water Resistance

The specimen was soaked into warm water of 40° C. for 240 hours to examine the state of coated film and adherence.

Adherence Test onto Various Substrates

Each sample was spray coated onto various substrates with the surface wiped with isopropanol so as the dried film thickness to become over 10 and under 15 μm, which was dried for 10 minutes at 80° C. Next, two-component type silver upper paint was spray coated so as the dried film thickness to become over 45 and under 50 μm, and, after allowed to stand statically for 15 minutes at room temperature, baking was performed for 20 minutes at 80° C. After the specimen was allowed to stand statically for 3 days at room temperature, 100 cross-cuts that reach the base were made on the coated surface at intervals of 2 mm. Cellophane adhesive tape was adhered closely thereon and it was peeled off in the direction of 180° to judge with the extent of remaining coated film.

molecular weight components being weak against solvent and water, both gasohol resistance and warm water resistance decrease. In the adherence test with the baking carried out at 80° C., the adherences in Comparative examples 2 and 4 wherein the degree of chlorination was lowered tend to further decrease due to decreased polarity and increased softening temperature.

It is seen therefore that, different from the aqueous dispersion obtained by simply using conventional polyolefin with low melting point as a raw material, the inventive aqueous dispersion containing maleic anhydride-modified chlorinated propylenic random copolymer is a useful resin that allows to produce high-solid aqueous dispersion, even by using chlorinated resin with lower degree of chlorination and higher molecular weight, and further that develops

TABLE 1

|  | Degree of chlorination | Heat seal strength (g/15 mm) | Primer test | | |
|---|---|---|---|---|---|
|  |  |  | Adherence | Gasohol resistance | Warm water resistance |
| Ex. 1 | 20.5% | 460 | 100/100 | No abnormality | No abnormality 100/100 |
| Ex. 2 | 15.6% | 550 | 100/100 | No abnormality | No abnormality 100/100 |
| Ex. 3 | 20.7% | 980 | 100/100 | No abnormality | No abnormality 100/100 |
| Ex. 4 | 15.5% | 1350 | 100/100 | No abnormality | No abnormality 100/100 |
| Comp. 1 | 20.4% | 190 | 70/100 | Peeling off after 10 min | No abnormality 30/100 |
| Comp. 2 | 15.5% | 180 | 75/100 | Peeling off after 10 min | No abnormality 50/100 |
| Comp. 3 | 20.5% | 220 | 100/100 | Peeling off after 5 min | Some blisters 25/100 |
| Comp. 4 | 15.8% | 240 | 100/100 | Peeling off after 10 min | Some blisters 30/100 |

TABLE 2

|  | PP | PET | PC | ABS | 6-PA | PVC | Wood flour/PP (51/49) composite |
|---|---|---|---|---|---|---|---|
| Ex. 1 | 100/100 | 100/100 | 100/100 | 100/100 | 100/100 | 100/100 | 100/100 |
| Ex. 2 | 100/100 | 100/100 | 100/100 | 100/100 | 100/100 | 100/100 | 100/100 |
| Ex. 3 | 100/100 | 100/100 | 100/100 | 100/100 | 100/100 | 100/100 | 100/100 |
| Ex. 4 | 100/100 | 100/100 | 100/100 | 100/100 | 100/100 | 100/100 | 100/100 |
| Comp. 1 | 75/100 | 70/100 | 70/100 | 90/100 | 70/100 | 80/100 | 80/100 |
| Comp. 2 | 85/100 | 60/100 | 30/100 | 90/100 | 30/100 | 75/100 | 70/100 |
| Comp. 3 | 90/100 | 95/100 | 80/100 | 95/100 | 100/100 | 90/100 | 90/100 |
| Comp. 4 | 80/100 | 50/100 | 50/100 | 75/100 | 80/100 | 60/100 | 70/100 |

UTILIZABILITY IN THE INDUSTRY

From the results as above, it is seen that the aqueous dispersions of maleic anhydride-modified chlorinated propylenic random copolymer of the invention exhibit good physical properties even under the conditions of drying and heat treatment at low temperature such as 80 or 90° C. Moreover they can correspond to the high solidification.

On the other hand, the aqueous dispersions of maleic anhydride-modified chlorinated SPP have poor adherence and, under that influence, both gasohol resistance and warm water resistance decrease. Also, the aqueous dispersions of maleic anhydride-modified chlorinated propylene-ethylene copoymer that uses Ziegler·Natta catalyst have relatively good adherence in the case of baking at 90° C., but, because of wider molecular weight distribution and existence of low excellent physical properties to various substrates even under the conditions of low-temperature baking, and is effective particularly for primer, paint, ink and adhesive.

The invention claimed is:

1. An aqueous dispersion comprising a carboxyl group-containing chlorinated propylenic isotactic random copolymer produced with a metallocene catalyst and with chlorine content of 5 to 40% by weight, based on amount of carboxyl group-containing chlorinated propylenic isotactic random copolymer, grafting level of α,β-unsaturated carboxylic acid or its anhydride of 0.1 to 20% by weight, based on raw material propylenic isotactic random copolymer, a weight average molecular weight of 10,000 to 300,000, and a melting point of from 115 to 135° C. as measured by differential scanning calorimetry; and stabilizer.

2. The aqueous dispersion of claim 1, further comprising a surfactant and a basic substance.

3. The aqueous dispersion of claim 2, wherein said basic substance is at least one member selected from the group consisting of sodium hydroxide, potassium hydroxide, sodium carbonate, ammonium carbonate, potassium carbonate, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, and morpholine.

4. A primer using the aqueous dispersion of claim 1 or 2.

5. A paint using the aqueous dispersion of claim 1 or 2.

6. An ink using the aqueous dispersion of claim 1 or 2.

7. An adhesive using the aqueous dispersion of claim 1 or 2.

8. A method of producing an aqueous dispersion comprising: dispersing a carboxyl group-containing chlorinated propylenic isotactic random copolymer into water, said carboxyl group-containing chlorinated propylenic isotactic random copolymer having weight average molecular weight of 10,000 to 300,000 and a melting point of from 115 to 135° C. as measured by differential scanning calorimetry, and being produced from a propylenic isotactic random copolymer prepared using a metallocene compound as a polymerization catalyst, said propylenic isotactic random copolymer being chlorinated up to chlorine content of 5 to 40% by weight, based on amount of carboxyl group-containing chlorinated propylenic isotactic random copolymer, after or before graft copolymerizing $\alpha,\beta$-unsaturated carboxylic acid or its anhydride onto the propylenic isotactic random copolymer in amounts of 0.1 to 20% by weight, based on raw material propylenic isotactic random copolymer.

9. The method of producing an aqueous dispersion of claim 8, further comprising adding a surfactant and a basic substance to said carboxyl group-containing chlorinated propylenic random copolymer prior to dispersing said carboxyl group-containing chlorinated propylenic random copolymer into water.

10. The method of claim 4, wherein basic substance is at least one member selected from the group consisting of sodium hydroxide, potassium hydroxide, sodium carbonate, ammonium carbonate, potassium carbonate, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, and morpholine.

* * * * *